United States Patent [19]

Nemeth

[11] 4,252,870
[45] Feb. 24, 1981

[54] VENT FOR BATTERY OF SELF-POWERED FOLDING GOLF CART

[75] Inventor: Edwin A. Nemeth, Martinez, Calif.

[73] Assignee: P. N. Associates, Inc., Walnut Creek, Calif.

[21] Appl. No.: 911,640

[22] Filed: Jun. 1, 1978

Related U.S. Application Data

[62] Division of Ser. No. 717,780, Aug. 25, 1976, Pat. No. 4,106,583.

[51] Int. Cl.² ............................................. H01M 2/12
[52] U.S. Cl. ................................... 429/84; 180/68.5; 429/88
[58] Field of Search ........................ 429/84, 87, 88, 82; 180/19 H, 68.5

[56] References Cited

U.S. PATENT DOCUMENTS

| | | | |
|---|---|---|---|
| 1,183,810 | 5/1916 | Gardiner | 429/82 |
| 2,263,689 | 11/1941 | Amelse et al. | 429/84 |
| 3,948,332 | 4/1976 | Tyner | 180/68.5 |

Primary Examiner—John J. Love
Assistant Examiner—Donn McGiehan
Attorney, Agent, or Firm—Townsend and Townsend

[57] ABSTRACT

Means for inhibiting the escape of liquid from a liquid electrolyte battery having at least one fluid vent, wherein the battery is subject to frequent partial rotation about a horizontal axis, such as in the mounting of a power-assisted manually operated golf-bag carrying tricycle cart. The apparatus comprises a manifold and a hollow tube defining a coil substantially in a plane perpendicular to the axis of contemplated battery rotation, the coil having an outlet suspended normally directly downwardly.

1 Claim, 8 Drawing Figures

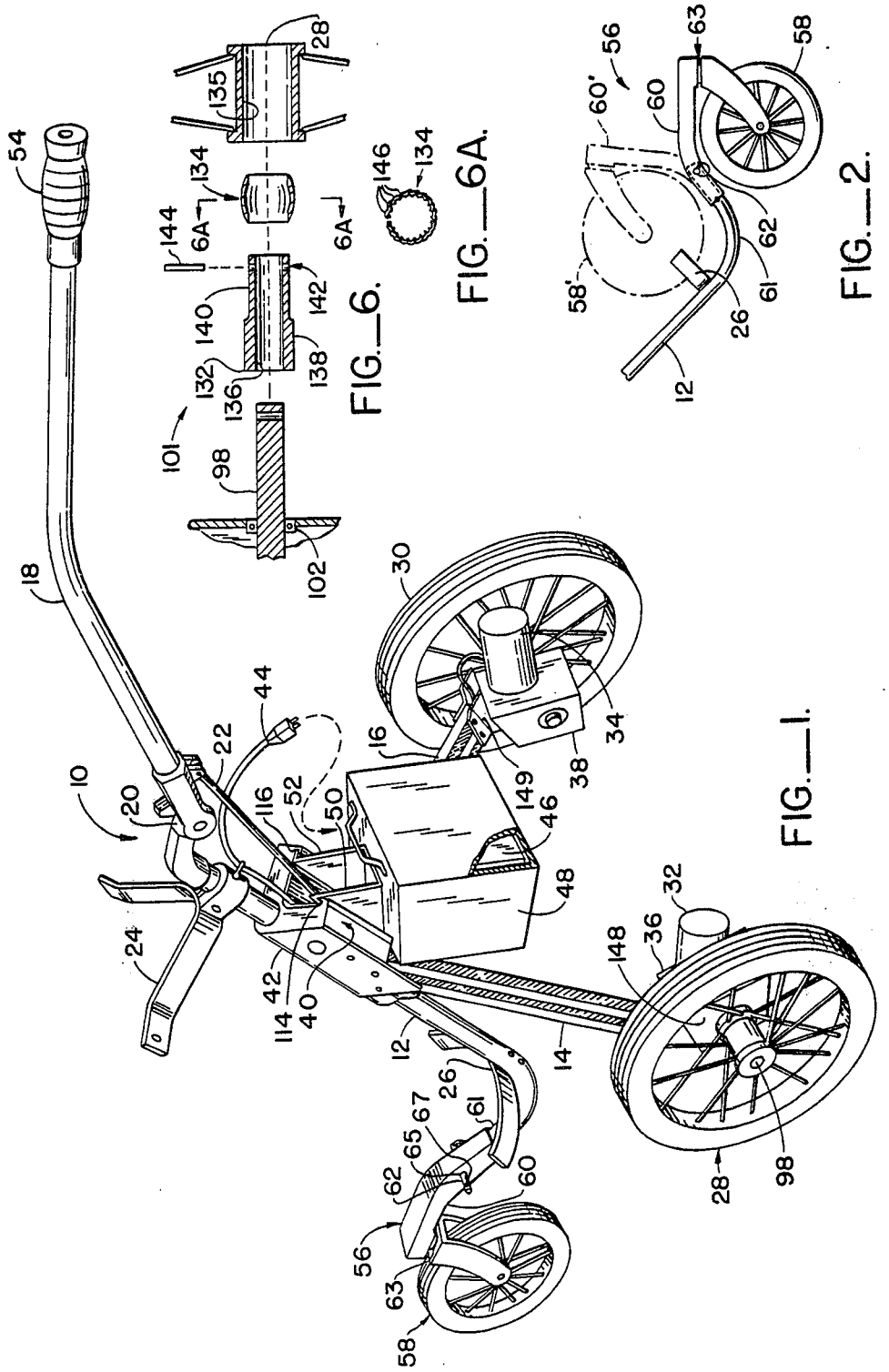

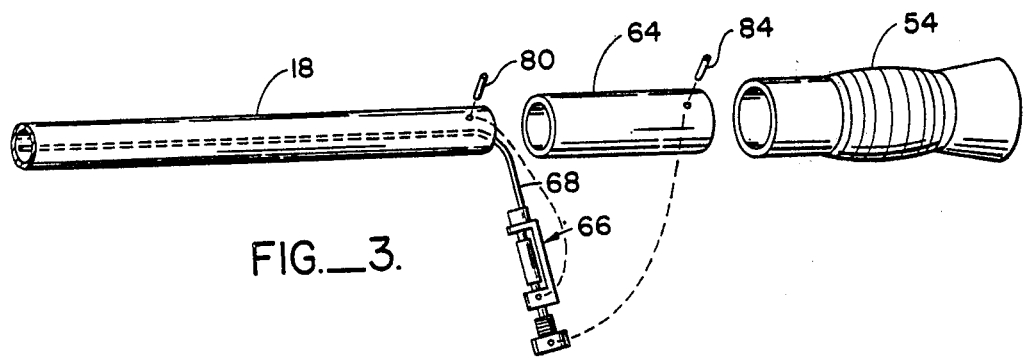
FIG._3.
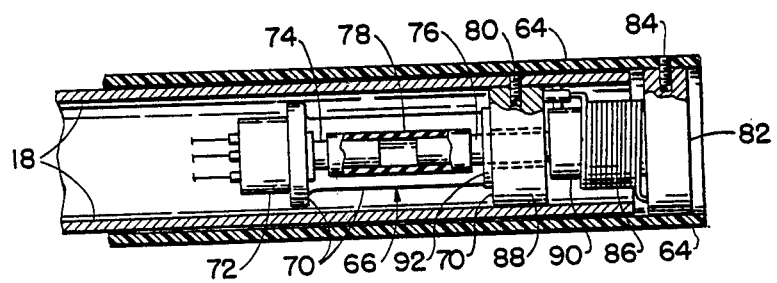
FIG._4.
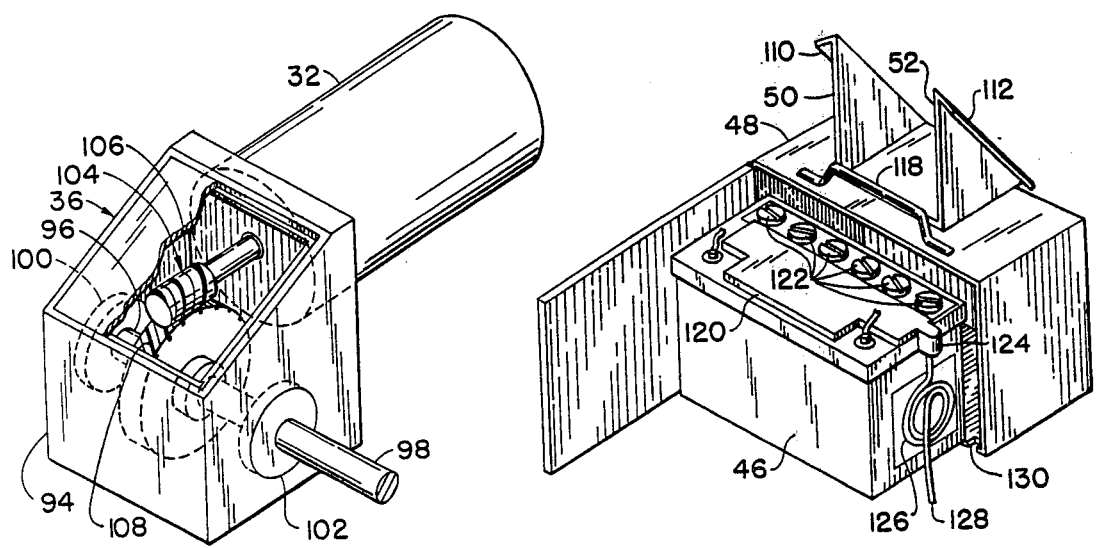
FIG._5.   FIG._7.

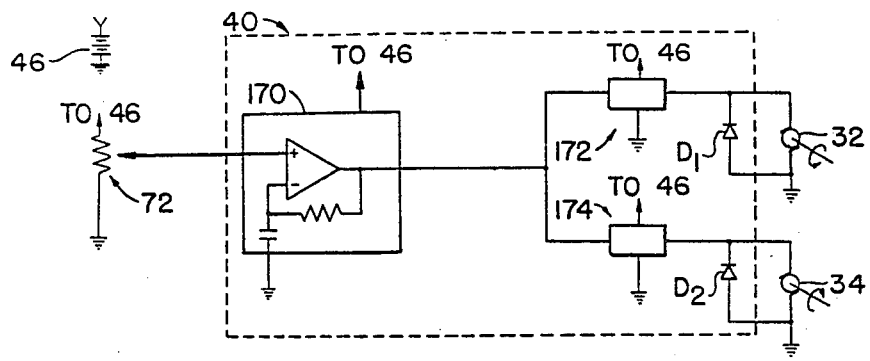
FIG._9.
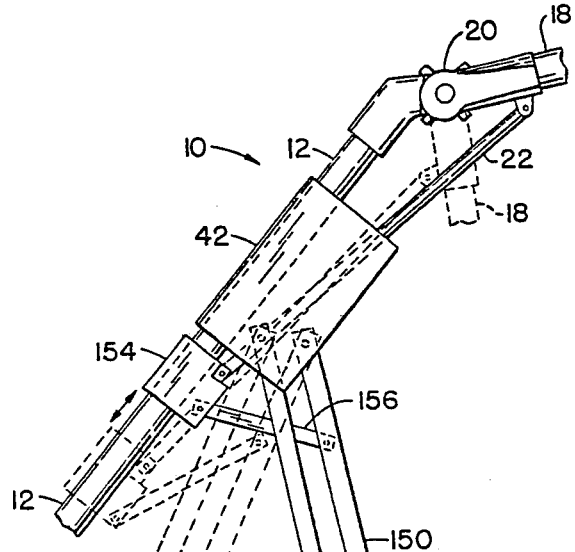
FIG._8.
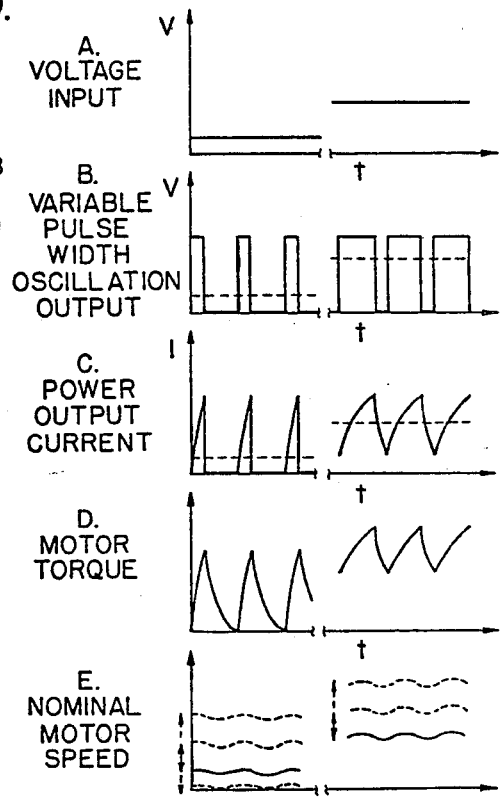
A. VOLTAGE INPUT
B. VARIABLE PULSE WIDTH OSCILLATION OUTPUT
C. POWER OUTPUT CURRENT
D. MOTOR TORQUE
E. NOMINAL MOTOR SPEED
FIG._10.
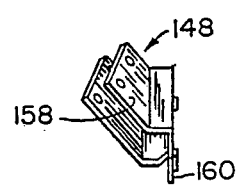
FIG._8A.

VENT FOR BATTERY OF SELF-POWERED FOLDING GOLF CART

CROSS REFERENCE TO RELATED APPLICATION

This is a division of application Ser. No. 717,780, filed Aug. 25, 1976, now U.S. Pat. No. 4,106,583 issued Aug. 15, 1978.

BACKGROUND OF THE INVENTION

1. Field of the Invention

This invention is related to self-powered electric carts and in particular to an electrically powered push-type collapsible tricycle cart having dual independent motor drive.

Electrically powered vehicles are quite popular on golf courses. However, vehicles large enough for transporting passengers are generally expensive and therefore beyond the means of the average golfer to purchase or to transport to and from the golf course. On the other hand, light pull- or push-type golf carts are known for caddying golf bags alone. Such non-powered carts are quite popular, especially if collapsible. However, a non-powered cart becomes a major burden to drag or push around the golf course.

As a compromise, powdered golf bag carrying carts have been proposed. However, such powered carts have not met with success for various reasons. A number of such problems, prior proposed solutions and shortcomings of these solutions are illustrated by the prior art.

2. Description of the Prior Art

One example of a powered golf club carrying cart is described in U.S. Pat. No. 3,704,758 to Cropp, wherein a pair of d.c. motors is series connected to a large bank of rather heavy multi-celled batteries. Such a device is costly, excessively heavy, bulky, unsightly and not easily stored or transported and therefore not readily accepted by the average golfer. A relatively light, collapsible golf cart is therefore needed.

Two-wheeled carts are often found to be unsuited to power drive. Such carts with the power source (the battery) located along the main column may be easily upset if tipped too far. Prior three-wheeled arrangements, such as suggested in the Cropp patent may provide stability, but known arrangements are not suited to collapsible carts, where compact storability is a prerequisite.

The battery power sources for golf carts contain corrosive battery acid which, if accidently leaked or spilled, can cause considerable damage. Yet, practical batteries must be vented in order to prevent the equally dangerous build up of gases. Golf cart power packs also can be accidently tipped during transportation or storage. Thus, there exists a need to provide a vented battery which includes means for containing battery acid against spillage as might be caused by accidental tipping.

SUMMARY OF THE INVENTION

A power assisted manually operated golf bag carrying cart features a foldable tricycle support frame having parallel drive wheels which can be maintained in parallel over the full range of adjustment, and independently powered direct drive d.c. motors coupled to shock isolated wheels. A control scheme includes a single handle with a mechanically isolated, continuously variable throttle and a power control circuit providing independent direct drive to each of the drive motors. The power control circuit drives the motors by providing a variable pulse width pulse train developing intermittent high peak torque, yet low average torque in the normal duty cycle range.

The motor drive scheme according to the invention provides an electrical limited slip differential which permits relatively easy turning without undesirable power transfer between wheels or wasteful power dissipation.

The invention also includes a battery acid trap to inhibit escape of acid from a vented battery, particularly if accidentally tipped.

A golf cart according to the invention incorporates a variety of advantages over the prior art, some of which are here listed. First, a cart as herein described is sufficiently powerful and sturdy enought to carry a load of golf clubs through the rugged terrain of a golf course. Second, the cart is relatively lightweight and energy efficient, so that it is easily handled and has a long service range. Third, the cart is easily adjusted to the preference of the user and can easily be stored in a collapsed compact position, for example in the trunk of a car. Fourth, the pivoting tricycle configuration removes any load carrying requirement from the operator, yet allows instant turning. Fifth, the differential scheme of the cart permits easy turning and prevents stalling in rough or uneven terrain. And sixth, the drive gearing and motors are protected against the danger of wheel shock damage through shock isolation between the wheels and the gearing.

Further advantages in the particular features of the invention are best understood by reference to the following detailed description and the accompanying drawings.

BRIEF DESCRIPTION OF THE DRAWINGS

FIG. 1 is a perspective view of a foldable golf club carrying cart according to the present invention;

FIG. 2 is a side view of third wheel castor assembly;

FIG. 3 is an explored perspective view of a throttle assembly according to the invention;

FIG. 4 is a side view in partial cutaway of the throttle mechanism of FIG. 3;

FIG. 5 is a perspective view in partial cutaway of a motor and drive assembly according to the invention;

FIG. 6 is a side cross sectional view of a drive wheel coupling according to the invention;

FIG. 6A is a front cross sectional view of a steel band in FIG. 6; and

FIG. 7 is a perspective view of a power pack for the golf cart, with a vented battery having an acid trap.

DETAILED DESCRIPTION OF PREFERRED EMBODIMENTS

FIG. 1 illustrates a golf club carrying tricycle cart 10 having a frame main column 12, legs 14 and 16 pivotally linked to the main column 12, and guiding arm 18 coupled to the main column 12 through an adjustable pivot 20 and supporting link 22. Golf bag supports 24 and 26 are provided on the main column 12 to support a golf bag (not shown) in an inclined position.

A pair of drive wheels 28 and 30 are each individually provided with electric motors 32 and 34, and drive trains 36 and 38, mounted at the end of each of the legs 14 and 16. The electric motors 32 and 34 are coupled to a power control circuit 40 which is mounted on the main column 12 within an enclosure 42. Power is provided through a cable 44, coupled to a power source, such as a d.c. battery 46, within a housing 48 detachably hung to the main column 12, on a pair of vertically disposed triangular struts 50 and 52 which retain the housing 48 in a relatively level position.

At the end of the guiding arm 18, a hand grip 54 is provided. The hand grip 54 serves both as a steering lever guiding the cart 10 and as a throttle for the motors 32 and 34.

Tricycle wheel assembly 56, including a pivotable caster wheel 58 rotatably coupled to a curved arm 60, is telescopically attached to the main column 12 and secured by a cotter pin 62. Referring to FIG. 2, it is seen that the lower portion of the main column 12 defines an upwardly arching segment 61 adjacent the end below the strut 26. The arm 60 is adapted to fit over the end of the main column 12 and to be secured in a first down position by the cotter pin 62 and in a second up position, as shown in phantom. In the down position, a pivot 63 through the arm 60 supporting the caster wheel 58 is approximately vertical with the ground. The wheel 58 is free to pivot to any orientation. In the second up position the axis of pivot is generally horizontal so that the caster wheel 58 hangs by its own weight. In the up position, the wheel 58 (in phantom) is in a compact upwardly and inwardly projecting suspended position approximately conforming to the upwardly arching elbow formed by main column segment 61 and the arm 60 (in phantom). Moreover, the hanging wheel 58 (in phantom) with the cart upright is protected by the strut 26.

The cotter pin 62 (FIG. 1) is readily though forcibly insertable into and removeable from keyway 65 through curved arm 60 and curved segment 61. The cotter pin 62 is a straight rod with a collapsible stop button 67 at the insertable end and a suitable stop such as a ring 69 at the opposite end.

FIG. 3 and FIG. 4 show a detail of the throttle on the guiding arm 18. The hand grip 54 is snugly attached to a hollow tube 64 which telescopically fits over the end of the hollow guiding arm 18. The tube 64 may be a suitable non-binding material, such as nylon. The inside of the tube 64 and the outside of the arm 18 act as a journal bearing permitting free axial rotation of the hand grip 54 relative to the arm 18.

Transducer 66 is provided which fits partially within the hollow end of the arm 18 and within the hollow tube 64. The transducer 66, which is for converting an angular position to an electrical signal, is coupled to the control circuitry (not shown) by a cable 68 through the center of the arm 18.

Referring particularly to FIG. 4, the transducer 66 comprises a generally axial frame member 70 to which is rigidly mounted a potentiometer 72 at one end facing a rotatable throttle shaft 76 mounted at the other end. The potentiometer 72 has a control shaft 74 extending approximately parallel to the axis of the frame member 70 toward an opposed end of the throttle shaft 76. A flexible coupling 78 links the control shaft 74 and the throttle shaft 76. The coupling 78 may be a short piece of elastic tubing such as surgical rubber tubing fixedly attached over each end of the respective shafts 74 and 76. The frame assembly 70 is locked to arm 18 by a set screw 30. The throttle shaft 76 is fastened to a circular cap 82 outside the end of arm 18 which is linked by a set screw 84 to the hollow tube 64 circumscribing arm 18.

Thus, the hand grip 54 is rigidly attached to the throttle shaft 76 which is rotatable with respect to the frame member 70, the frame member 70 being fixedly attached to the arm 18. Biasing means, such as a coil spring 86 may be provided between the rotatable portion and the fixed portion 76 and thereby to the control shaft 74 to maintain the throttle shaft in a desired rest position.

Constructed as herein described the electrical portion, namely the potentiometer, is mechanically isolated from the mechanical portions, including the throttle shaft 76 and hand grip 54, which are subject to substantial axial loading during use which would otherwise damage the potentiometer 72, since the hand grip 54 is used to guide as the cart 10 is pushed, pulled or turned. Moreover, the elasticity of the flexible coupling 78, readily maintains the potentiometer shaft in a fully off rest position and compensates for any misalignment between the shaft of the potentiometer 74 and the throttle shaft 76.

The throttle hand grip 54 is the principal manual control mechanism for the cart 10. (Two-state type controls such as a forward, reverse switch - not shown - braking mode control switch—not shown—may be separately mounted on the guiding arm 18.) To move the cart 10 straight ahead, the operator merely twists the hand grip 54, which activates the throttle 66. The circular cap 82 rotates the throttle shaft 76 and coupling 78, which in turn rotates the control shaft 74 of potentiometer 72. The resultant change of electrical resistance is communicated as an electrical signal via cable 68 to the motor power control circuit 40 (FIG. 1). The motors are each independently activated to pull the cart forward as hereinafter explained. The side wheels 28 and 30, if equally loaded, direct the cart 10 substantially straight ahead. To turn the cart, the operator may press the hand grip 54 and thereby the guiding arm 18 to the right or the left, either pushing one wheel slightly faster motor speed and the speed of the other wheel, or slowing one wheel and motor to permit the other motor and wheel to pull the cart 10 in the desired turning arc.

The frame member 70 must be a relatively sturdy construction. For example, the frame member 70 may include a block 88 snugly engaging the inner wall of the arm 18 and supporting the set screw 80. The throttle shaft 76 may be held against axial displacement with respect to the block 88 by a cylinder 90 attached to shaft 76 on one side of the block 88 and by locking ring 92 attached to the shaft 76 on the opposite side of the block 88. A thrust bearing between block 88 and lock ring 92 allows free rotation of the mechanism even under heavy axial loads.

Referring now to FIG. 5, one of the motors and drive trains is illustrated, namely the left side motor 32 and drive train 36, the right side motor 34 and drive train 38 being mirror images thereof. The drive train 36 includes a casing 94 and a drive shaft 96 intergrally formed with a wheel supporting axle 98 and mounted on bearings 100 and 102 in the casing 94. The drive train comprises a worm gear 104 including a shaft 106 extending from the rotor (not shown) of the motor 34 and coupled at right angles to a wheel gear 108 which is mounted to the drive shaft 96.

The drive train 36 and 38 provide direct drive between the individual motors 32 and 34 and the axles 98.

FIG. 6 illustrates a coupling 101 between the axle 98 and the wheel 28. As shown, a wheel busing 132 and a flexible corrugated steel band 134 are interposed between the axle 98 and a hollow axial tube 135 of wheel 28. The wheel bushing 132 comprises a cylinder having an inner diameter 136 conforming to the outer diameter of the axle 98 and a maximum outer diameter on one segment 138 conforming to the inner diameter of the wheel tube 135. A narrower diameter segment 140 is provided adjacent the normally outboard end of the bushing 132. The bushing 132 is also provided with a keyway 142 which accommodates a cotter key or pin 144.

The corrugated steel band 134 comprises a thin sheet of spring steel shim or the like provided with axially aligned corrugations 146. This construction is illustrated in a cross section of the band 134 in FIG. 6A.

The wheel to axle coupling 101 is assembled as follows. The band 134, formed into a ring, is fitted over the bushing 132 on segment 140. The wheel 28 is pressed onto the bushing 132 and held in place under frictional compression by the steel band 134. The wheel 28 bushing 132 and steel band 134 are then mounted to the axle 98 and fastened with pin 144.

The band 134 secures the wheel 28 against undesired rotational slippage. Under normal loads no slippage is permitted. However, should the wheel 28 encounter rocks or other large objects, the band 134 permits limited slippage of the wheel 28 relative to the axle 98, thereby at least partially isolating the gears of the drive train 36 from damaging shocks which might otherwise disable the cart 10. The cart 10 therefore benefits from the efficiency of essentially direct drive; yet it is protected against shock damage which might otherwise result from normal use. As a result, direct drive, smaller and lighter motors and drive trains can be used, reducing power consumption and extending the useful range of the cart. Moreover, need for frequent repair or replacement of drive parts is substantially reduced.

FIG. 7 illustrates the d.c. power supply, including battery 46 and housing 48 for the cart 10. The housing 48 includes vertically disposed triangular struts 50 and 52 having rails 110 and 112 along the top margin which are adapted to fit in tracks 114 and 116 (FIG. 1) mounted to the main column 12 of the cart 10. The battery housing 48 is suspended from a stabilizing location, e.g., the center of gravity of the cart 10. A handle 118 on the top of the housing 48 is provided to facilitate handling and carrying.

The d.c. battery 46 is generally a lead acid-type vented battery capable of deep discharge and recharge. Sealed batteries are found to be unsatisfactory in the present application, since the known sealed batteries are unsuited to applications subject to deep discharge before recharge. Large quantities of gases are typically liberated during recharge, so means must be provided for releasing the fumes.

With reference to FIG. 7 the battery 46 is seen to include a manifold 120 sealably covering access vents (not shown) in the top of the battery. The manifold 120 comprises a generally flat thin hollow chamber which sealably covers the top of the battery 46. Sealed battery caps 122 are provided through the manifold covering holes through which the battery acid may be replenished. The top of each cap 122 is sloted to accommodate a screwdriver for tightening and loosening the caps 122 which are thread mounted through the manifold 120.

At one side of the manifold 120 adjacent the battery side, a manifold fluid outlet 124 is provided. Sealably coupled to the fluid outlet 124 is an open tube 126. The tube 126 is wound in a coil and placed on the side of the battery 46 with its open end 128 directed downwardly. The battery 46 is placed in the battery housing 48. A slot 130 is provided in the bottom of the housing 48 to accommodate the open end 128.

If the battery 46 in its housing 48 is inadvertently tipped, the sealed manifold 120 in combination with the coiled tube 126 inhibits the undesired escape of battery acid from the battery 46, which would otherwise occur. Where the battery is temporarily stored or transported, for example in the trunk of a car, the coiled tube prevents spillage of battery acid electrolyte which might cause serious damage.

As other advantages and alternative embodiments are suggested to the person skilled in the relevant art, it is not intended that the invention herein described be limited, except as indicated by the following claims, which set forth the various inventive features.

I claim:

1. Means for inhibiting the escape of liquid from a liquid electrolyte battery having at least one fluid vent, wherein said battery is subject to frequent partial rotation about a horizontal axis, said escape inhibiting means comprising:

a manifold on a normally top side of said battery sealably enclosing said fluid vent and having an outlet which is normally downwardly disposed and which protrudes from the top side of said battery over a vertical side, the vertical side being disposed perpendicular to said axis of rotation of said battery;

a hollow tube defining a coil which is substantially wholly in a plane perpendicular to said axis of battery rotation, the coil having an inlet coupled to said manifold outlet and further having a coil outlet suspended normally directly downwardly from the center of said coil and below the coil inlet, and wherein the coil is mounted external of the battery on one side thereof, whereby liquid discharged from said manifold is inhibited from draining from said battery as said battery is tilted.

* * * * *